April 1, 1924.
A. M. HAMBRIGHT
ALTERNATING CURRENT MOTOR
Filed May 4, 1920
1,488,876
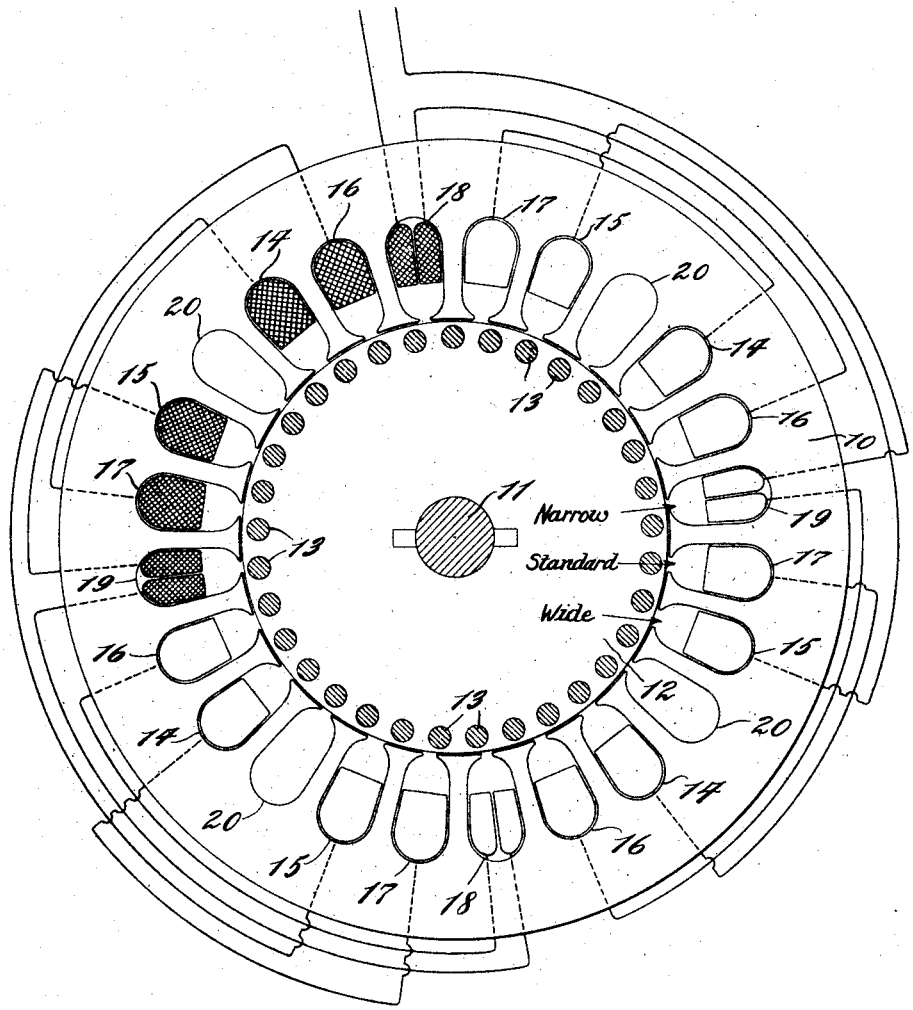
WITNESS:
INVENTOR.
BY
ATTORNEYS Patented Apr. 1, 1924.

1,488,876

UNITED STATES PATENT OFFICE.

ARTHUR M. HAMBRIGHT, OF PATERSON, NEW JERSEY, ASSIGNOR, BY MESNE ASSIGNMENTS, TO GILLESPIE EDEN CORPORATION, A CORPORATION OF DELAWARE.

ALTERNATING-CURRENT MOTOR.

Application filed May 4, 1920. Serial No. 378,724.

*To all whom it may concern:*

Be it known that I, ARTHUR M. HAMBRIGHT, a citizen of the United States, and residing at Paterson, in the county of Passaic and State of New Jersey, have invented certain new and useful Improvements in Alternating-Current Motors, of which the following is a specification.

My present invention relates to improvements in alternating current motors, particularly such a motor in which a plurality of concentric coils are placed in slots in the field piece through narrow openings between such slots and the outer or inner periphery of the piece.

One of the objects of my invention is to provide a motor in which such coils may be more readily assembled than has been done heretofore, and which will at the same time provide a motor of the same desirable electrical characteristics as exist in motors in which my improvement is not incorporated.

With these and other objects in view, my invention consists of the arrangements and constructions herein described and more particularly pointed out in the appended claims.

In order to illustrate my invention I have shown in the accompanying drawing a figure representing a cross section through a well-known form of alternating current motor which is provided with a stationary field or stator, and a squirrel cage rotor. It will be understood, however, that my invention may be applied to a motor in which these conditions are reversed so that the field rotates, and also to the well-known form of motor in which the field rotates by being attached to the central shaft.

In the form which I have adopted for the purpose of illustration only, 10 is the field piece which, as is usual, may be made up of laminations. The central portion of the field piece is cut out, and around this central portion is provided a series of uniformly spaced slots, in the form shown twenty-four in number, the motor illustrated being four-poled and having three concentric coils to each polar winding. At the upper left hand quarter I have illustrated more or less diagrammatically the coils as they would be located in the slots for a single pole, it being understood that the windings for the remaining poles are the same as that fully illustrated. It will also be understood that the particular windings and their connections form no part of my present invention and are, therefore, illustrated only diagrammatically.

On the central shaft 11 is mounted the usual squirrel cage rotor 12, provided with bars 13, all of the usual type. Preferably, the bars 13 will be staggered or angled from end to end to decrease the noise of the motor.

Referring now to the slots forming the pole, it will be understood that the center coil of a winding occupies the slots 14, 15, that the next outer coil occupies the slots 16, 17, and that the outer coil occupies a part of each of the slots 18, 19. The slots 18 and 19 also receive a portion of the outer coils of the adjacent windings. The central slot 20 does not have a polar winding but will have other windings therein, such as starting coils for certain types of motors.

As motors of the type illustrated have heretofore been assembled or wound, the coils are passed through the openings into the slots, and as such field pieces have heretofore been constructed, these openings have been of the same width for each of the slots, and have been reduced to a minimum in order to decrease, as much as possible, the air gap which results from the presence of these openings.

While this invention may be used in motors having many forms of coils, it is particularly applicable to coils in which the wires intended to lie in the slots are not bound together with tape or other stiffening material. The end portions of the coils, which lie outside the slots are usually taped even when the side portions, which lie in the slots, are not, but the invention is not restricted to coils having their end portions taped. By reason of the relatively small diameter or internal width of the inner coil of each winding, difficulty has been experienced in passing this inner winding into its slots, and by my present invention I decrease this difficulty by widening the slot openings for the inner coil. If this widening were carried out throughout the periphery of the field piece, there would be a large increase in the effective air gap and a resultant loss in the desired electrical characteristics. I have found, however, that I can maintain the electrical characteristics substantially constant by making only the openings for the slots for the inner coil of each winding wider than is customary, and particularly this may be accomplished by simultaneously decreasing the openings of the slots for the outer coil of each winding. This outer coil, by reason of the relatively small number of wires and its relatively larger diameter or internal width, may be more readily inserted through a narrower slot than can the inner coil.

As a result, in the form illustrated, where there are three concentric coils to each winding, I widen the openings of the slots 14 and 15, and narrow the openings of the slots 18 and 19, preferably leaving the openings of the slots 16 and 17 of normal width. When this is done it will be seen that I provide a series of openings beginning with the center of the winding, which openings decrease progressively from the center to the outer slot of the winding. By this arrangement, the total width of the field slot openings and, consequently, the effective air gap, is maintained substantially constant, and whatever slight differences exist I have found that I can compensate for by closing the usual slots between the openings for the bars 13 on the outer periphery of the rotor.

As a result of such changes, I obtain a motor having substantially the same electrical characteristics as a motor in which the slot openings are uniform, and at the same time one in which the coils may be more readily inserted in the field piece than may be done when such openings are uniform.

While I have described my invention as applied to a four-poled motor with three coils to each polar winding, it will be understood that it may be applied to a motor having any desired number of poles and any desired number of coils to each polar winding. It will be also understood that, while I have referred to each set of concentric coils as a polar winding, that this is true only in a mechanical sense, and that when the machine is running, the armature reaction causes the location of the resultant magnetic poles to be some distance from the center of these windings. It may even be between adjacent portions of the outer coils of neighboring windings.

It will also be understood that, while it is known that the slot openings, in the slots which contain the rotor bars, may be closed, such an arrangement is particularly useful in a motor with a field constructed according to my invention, because such a rotor tends to compensate for the slight increase of the effective air gap arising from the increase of the openings from the slots for the center windings, which increase is not fully compensated for by the decrease in the openings of the slots for the outer windings.

I claim:

1. A field element for a multipolar alternating current motor having a plurality of coils for each polar winding, comprising a member having a plurality of slots for the reception of the windings, with openings between each slot and the adjacent edge of the member, the openings of the slots for the inner coil of each polar winding being wider than the openings of the slots for the outer coil of such winding.

2. A field element for a mutipolar alternating current motor having a plurality of coils for each polar winding, comprising a member having a plurality of slots for the reception of the windings, with openings between each slot and the adjacent edge of the member, the width of the openings of the slots for the coils of each polar winding decreasing progressively from the center of each polar winding, whereby the slots for the inner coil have a relatively wide opening and the slots for the outer coil have a relatively narrow opening.

3. A field element for a multipolar alternating current motor having a plurality of coils for each polar winding, comprising a member having a plurality of slots for the reception of the windings, with openings between each slot and the adjacent edge of the member, the width of the openings of the slots for the coils of each polar winding decreasing progressively from the center of each polar winding, with the openings of the slots for the inner coil wider than normal and the openings of the slots for the outer coil narrower than normal.

4. A field element for a multipolar alternating current motor having three coils for each polar winding, comprising a circular member having a plurality of slots for the reception of the windings with openings between each slot and the adjacent edge of the member, the openings of the slots for the middle coil of each polar winding being of normal width, the openings of the slots for the inner coil being wider than normal and the openings of the slots for the outer coil being narrower than normal.

5. A field element for a multipolar alternating current motor having three coils for each polar winding, comprising a circular member having a plurality of slots for the reception of the windings with openings between each slot and the adjacent edge of the member, the openings of the slots for the middle coil of each polar winding being of normal width, the openings of the slots for the inner coil being wider than normal and the openings of the slots for the outer coil being narrower than normal, and the average width for the openings of all the slots in the member being approximately normal.

ARTHUR M. HAMBRIGHT.